(12) United States Patent
Galera Córdoba et al.

(10) Patent No.: US 12,589,888 B2
(45) Date of Patent: Mar. 31, 2026

(54) METHOD FOR MANUFACTURING STRINGERS FOR AIRCRAFT AND STRINGER OBTAINED BY SAID METHOD

(71) Applicant: Airbus Operations S.L.U., Getafe (ES)

(72) Inventors: Georgina Galera Córdoba, Getafe (ES); Victor Diaz Diaz, Getafe (ES); Fernando Muñoz Ajenjo, Getafe (ES); Antonio Torres Esteban, Getafe (ES); Jose Maria Blanco Saiz, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 147 days.

(21) Appl. No.: 18/482,928

(22) Filed: Oct. 9, 2023

(65) Prior Publication Data

US 2024/0116652 A1     Apr. 11, 2024

(30) Foreign Application Priority Data

Oct. 11, 2022     (EP) ..................................... 22382966

(51) Int. Cl.
| | |
|---|---|
| *B64C 1/06* | (2006.01) |
| *B29C 70/30* | (2006.01) |
| *B29C 70/54* | (2006.01) |
| *B64F 5/10* | (2017.01) |

(52) U.S. Cl.
CPC ................ *B64F 5/10* (2017.01); *B29C 70/30* (2013.01); *B29C 70/545* (2013.01); *B64C 1/064* (2013.01)

(58) Field of Classification Search
CPC .... B29C 70/543; B29C 70/386; B29C 70/382
See application file for complete search history.

(56) References Cited

U.S. PATENT DOCUMENTS

| | | | | |
|---|---|---|---|---|
| 4,886,009 | A | * | 12/1989 | Gondar .................... G01N 3/56 |
| | | | | 408/116 |
| 2011/0100538 | A1 | | 5/2011 | Inserra Imparato et al. |
| 2012/0076973 | A1 | | 3/2012 | Guzman et al. |
| 2013/0092323 | A1 | | 4/2013 | Pham et al. |
| 2013/0133171 | A1 | | 5/2013 | Miguez Charines et al. |
| 2018/0141288 | A1* | | 5/2018 | Jung ......................... B32B 5/26 |
| 2019/0329856 | A1 | | 10/2019 | Shinozaki |

FOREIGN PATENT DOCUMENTS

| | | | |
|---|---|---|---|
| EP | 2295228 | A1 | 3/2011 |
| EP | 2747972 | B1 | 3/2018 |
| EP | 2668023 | B1 | 8/2019 |
| EP | 3560689 | A1 | 10/2019 |

OTHER PUBLICATIONS

European Search Report for corresponding European Patent Application No. 22382966 dated Mar. 7, 2023; priority document.

* cited by examiner

*Primary Examiner* — Scott W Dodds
(74) *Attorney, Agent, or Firm* — Greer Burns & Crain Ltd.

(57) ABSTRACT

A method for manufacturing stringers for aircraft, wherein the stringer comprises two semi-stringers, includes steps of placing tows on a flat surface for forming the semi-stringers independently or at the same time, the placement being made by partially overlapping the tows and orientating the tows on the flat surface according to boundaries of the flat surface, the tows covering the boundaries of the flat surface; and cutting the tows so that a shape of the tows corresponds to the shape of the flat surface defined by boundaries of the flat surface.

8 Claims, 3 Drawing Sheets

METHOD FOR MANUFACTURING STRINGERS FOR AIRCRAFT AND STRINGER OBTAINED BY SAID METHOD

CROSS-REFERENCES TO RELATED APPLICATIONS

This application claims the benefit of the European patent application No. 22382966.4 filed on Oct. 10, 2022, the entire disclosures of which are incorporated herein by way of reference.

FIELD OF THE INVENTION

The present invention relates to a method for manufacturing stringers for aircraft, and to a stringer for aircraft obtained by the method, in particular, a method for manufacturing prepreg T stringers for aircraft and the prepreg T stringer.

BACKGROUND OF THE INVENTION

In an aircraft fuselage, stringers are attached to frames and usually run in the longitudinal direction of the aircraft. They are primarily responsible for transferring the aerodynamic loads acting on the skin onto the frames.

The stringers used in aircraft fuselages can have different shapes in cross section, according to the desired use, and one of these stringers has a T shape in cross section, and it is usually called as T stringer.

These kinds of stringers are usually made from a prepreg material, i.e., a composite material made from pre-impregnated fibers and a partially cured polymer matrix, such as epoxy or phenolic resin, or even thermoplastic mixed with liquid rubbers or resins.

Therefore, these stringers are usually known in the art as prepreg T stringers.

Currently known prepreg T stringers have a flat web geometry, in chord wise direction, which implies high material scrap quantity for adjusting the automatic lay-up strategy to the required laminate boundaries.

Furthermore, currently known prepreg T stringers have a symmetric web geometry which implies a high complexity for the manufacturing process considering the raw material selected as baseline, with a high thickness, e.g., 2" (5.08 cm). This is a high risk for the final stringer surface quality.

SUMMARY OF THE INVENTION

Therefore, an objective of the present invention is to provide a method for manufacturing stringers for aircraft and a stringer obtained by the method.

With the method and the stringer for aircraft of the invention, the above mentioned disadvantages are solved, presenting other advantages that will be described below.

In particular, in the method for manufacturing stringers for aircraft, the stringer comprising two semi-stringers, the method comprises the following steps:

placing tows on a flat surface for forming the semi-stringers independently or at the same time, the placement being made by partially overlapping the tows and orientating the tows on the flat surface according to boundaries of the flat surface, the tows covering the boundaries of the flat surface; and cutting the tows so that its shape corresponds to the shape of the flat surface defined by its boundaries.

Furthermore, the flat surface has an elongated shape and defines a central line, and the tows are substantially rectangular defining larger and smaller sides, and the tows are advantageously oriented so that the larger sides of the tows form an angle between 45° and 90° with respect to the central line of the flat surface.

According to a preferred embodiment, each semi-stringer is folded to an L shape, forming a T shape stringer.

Furthermore, a release film can be placed between the two semi-stringers.

In the method for manufacturing stringers for aircraft according to the present invention, when the tows are overlapped, a protruding portion is formed in one or both semi-stringers.

Preferably, the flat surface on which the semi-stringers are formed has a curved shape, so that the finished stringer will also have a curved shape. That is, while the surface is flat in one direction, such as laterally, the surface may be curved in another direction, such as longitudinally.

Furthermore, if the semi-stringers are formed independently, the two semi-stringers forming the stringer are joined subsequently.

According to a second aspect, the present invention also refers to a stringer for aircraft made by the method as defined previously.

The method and the stringer according to the present invention at least have the following advantages compared with the known stringers:

the material scrap is dramatically reduced, because a better adjustment to the boundaries of the flat surface, i.e., to the final shape of the stringer, is obtained;

the asymmetric geometry, when the protruding portion is also in one of the semi-stringers, improves the stringer manufacturing method, ensuring the stringer quality;

stress properties are equivalent to currently known stringers, and the ratios strength/weight and stiffness/weight are very similar.

BRIEF DESCRIPTION OF THE DRAWINGS

For better understanding of what has been disclosed, some drawings in which, schematically and only by way of a non-limiting example, a practical case of embodiment is shown.

DETAILED DESCRIPTION OF THE PREFERRED EMBODIMENTS

Figure 1:
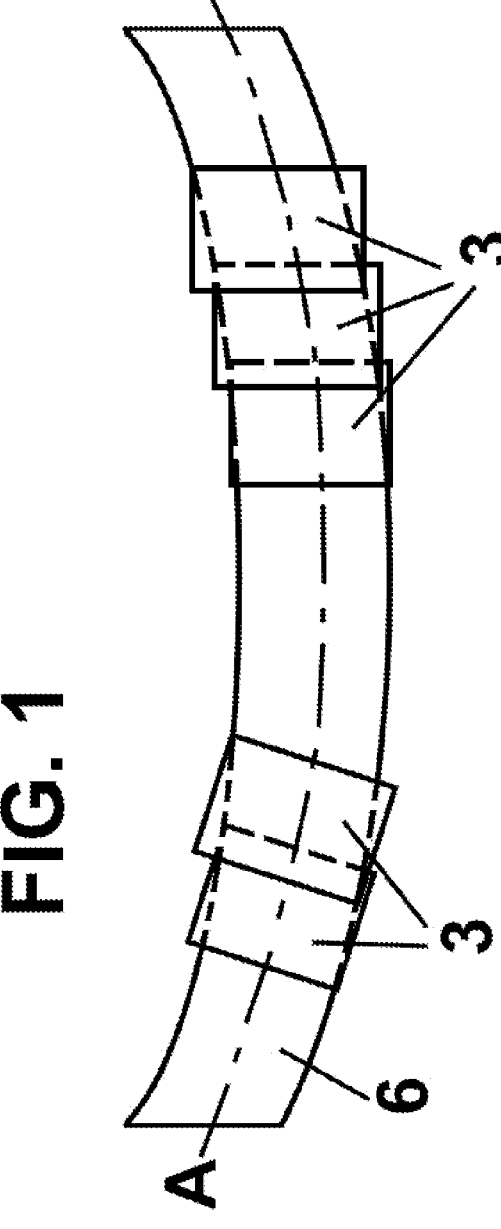
FIG. 1 is a diagrammatical plan view of the stacking step of the method according to the present invention.

The method for manufacturing stringers for aircraft according to the present invention has an objective of producing less scrap than the traditional methods, and this is obtained by adjusting the stringer to be manufactured to the desired final shape, as will be described hereinafter.

The method for manufacturing stringers 1 for aircraft according to the present invention starts with providing a flat surface 6 with the desired flat shape for the final stringer 1.

In the embodiment shown in the drawings, the surface 6 is flat in a lateral direction, and curved in a longer, longitudinal direction.

This flat surface 6 has an elongated shape that defines a central line, designated A in FIG. 1 and also defining boundaries.

The stringer 1 to be manufactured comprises two semi-stringers 2, and each semi-stringer 2 is formed by several tows 3.

These tows 3 are placed on the flat surface 6 so that they partially overlap, as shown in FIG. 1, and they are oriented according to the boundaries of the flat surface 6.

The tows 3 are substantially rectangular defining larger and smaller sides, and the tows are advantageously oriented so that the larger sides of the tows form an angle, e.g., between 45° and 90° with respect to the central line A of the flat surface 6, so that at least one vertex of each tow 3 is placed in the boundary of the flat surface 6, and only a reduced portion of the tows 3 extends outside the flat surface 6. This portion that extends outside the flat surface 6 is subsequently cut, for obtaining two semi-stringers 2 with the desired shape, but the scrap is reduced in comparison to a conventional method in which the tows are not suitably oriented according to the desired shape.

The tows 3, once placed and partially overlapped, cover the whole flat surface 6, and a protruding portion 4 is formed in one or both semi-stringers 2 by this overlap, or at one side or both side of the final stringer.

Figure 2:
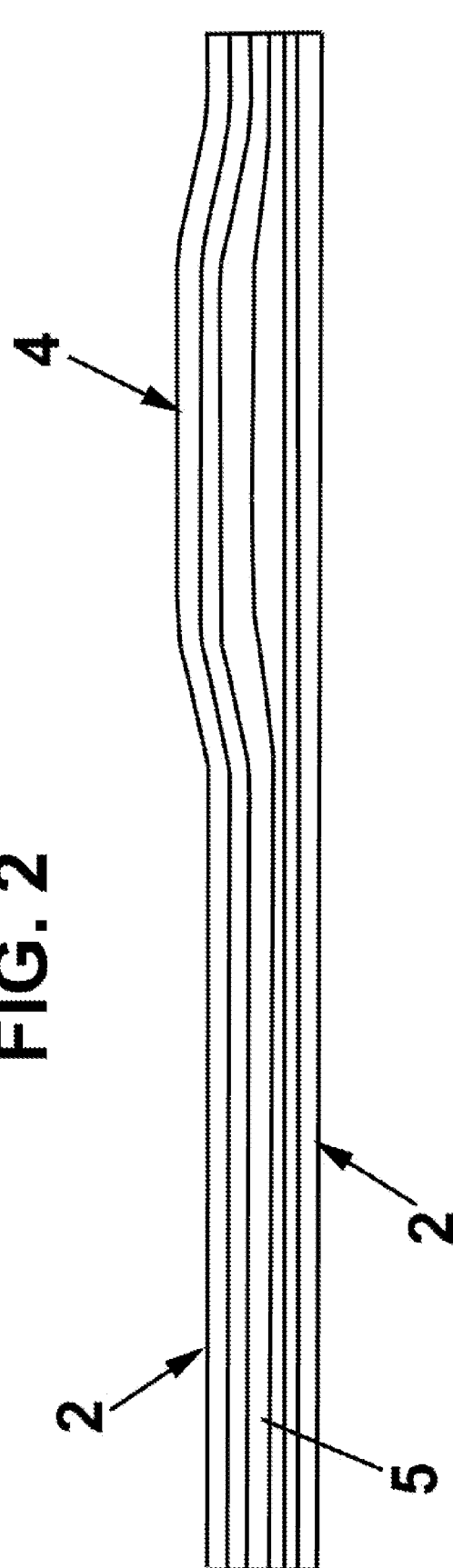
FIG. 2 is a cross-sectional view of the stringer according to the present invention before shaping the semi-stringers to a T shape.
Figures 3, 4:
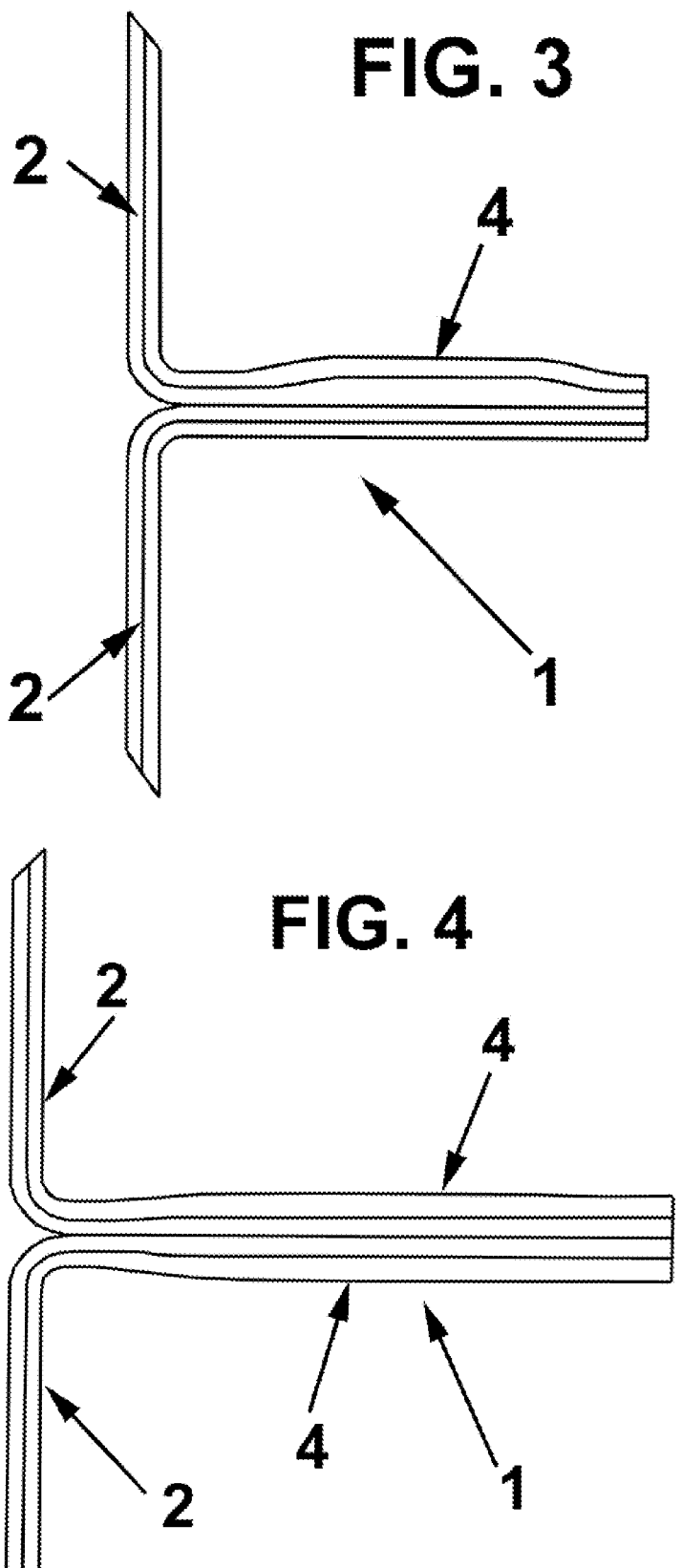
FIG. 3 is a cross-sectional view of the stringer according to the present invention in which the protruding portion is only on one of the semi-stringers.
FIG. 4 is a cross-sectional view of the stringer according to the present invention in which the protruding portion is on both semi-stringers.

The two semi-stringers 2 can be formed at once or each semi-stringer 2 can be formed independently and then joined together, so that if they are formed at once, the protruding portion 4 is only present at one side, as shown in FIGS. 2 and 3, and if the semi-stringers 2 are formed independently, the protruding portion 4 is present at both sides of the stringer, as shown in FIG. 4.

Once the semi-stringers 2 are formed in a flat configuration, shown in FIG. 2, they are folded to an L shape, so that they form a T shape stringer.

For permitting this folding of each semi-stringer 2, a release film 5 is preferably placed during the manufacturing method, in particular, during the placement of the tows 3, between both semi-stringers 2.

This folding of the semi-stringers 2 can be made, e.g., by using rollers, but it can also be made by any known technology.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing stringers for aircraft, the stringers each comprising two semi-stringers, the method comprising the following steps:

placing tow tapes which are substantially rectangular and include larger sides and smaller sides on a flat surface that has an elongated shape and defines a central line for forming the semi-stringers independently or at the same time, said placing being made by partially overlapping the tow tapes and orientating the tow tapes on the flat surface according to boundaries of the flat surface, the tow tapes covering the boundaries of the flat surface and a whole of the flat surface; and cutting the tow tapes so that a shape of the tow tapes corresponds to a shape of the flat surface defined by the boundaries of the flat surface;

joining the cut tow tapes together thus forming a first semi-stringer of the two semi-stringers;

forming a second semi-stringer of the two semi-stringers via the same process by which the first semi-stringer is formed either independently or at the same time on the flat surface; and joining each of the two semi-stringers together, wherein the tow tapes are oriented so that the larger sides of the tow tapes form an angle between 45° and 90° with respect to the central line of the flat surface.

2. The method for manufacturing stringer for aircraft according to claim 1, wherein the first and second semi-stringers are each folded to an L shape, and wherein the joining forms a T shaped stringer.

3. The method for manufacturing stringer for aircraft according to claim 1, wherein a release film is placed between the two-stringers during forming.

4. The method for manufacturing stringers for aircraft according to claim 1, wherein when the tow tapes are overlapped, a protruding portion is formed in one or both semi-stringers.

5. The method for manufacturing stringers for aircraft according to claim 1, wherein the flat surface has a curved shape in at least one direction.

6. The method for manufacturing stringer for aircraft according to claim 1, wherein each of the semi-stringers is formed independently.

7. The method for manufacturing stringers for aircraft according to claim 1, wherein at least one vertex of each tow is placed in a boundary of the flat surface.

8. The method for manufacturing stringers for aircraft according to claim 1, wherein the tow tapes are overlapped such that a shape of the overlap between the two tapes is rectangular.

* * * * *